United States Patent
Sasahara

(10) Patent No.: US 9,071,469 B2
(45) Date of Patent: Jun. 30, 2015

(54) SIGNAL IDENTIFICATION DEVICE

(71) Applicant: Kabushiki Kaisha Toshiba, Tokyo (JP)

(72) Inventor: Shoichi Sasahara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 13/783,012

(22) Filed: Mar. 1, 2013

(65) Prior Publication Data

US 2013/0235945 A1 Sep. 12, 2013

(30) Foreign Application Priority Data

Mar. 9, 2012 (JP) ................................. 2012-053514

(51) Int. Cl.
*H04L 27/00* (2006.01)
*H04L 27/26* (2006.01)
*H04L 25/03* (2006.01)

(52) U.S. Cl.
CPC ............. *H04L 27/00* (2013.01); *H04L 27/0012* (2013.01); *H04L 27/0008* (2013.01); *H04L 25/03159* (2013.01); *H04L 27/2647* (2013.01); *H04L 2025/03414* (2013.01)

(58) Field of Classification Search
CPC ............ H04L 27/2647; H04L 27/0008; H04L 27/0012; H04B 7/0689
USPC .................................. 375/260, 340, 342, 349
See application file for complete search history.

(56) References Cited

U.S. PATENT DOCUMENTS

| | | | | |
|---|---|---|---|---|
| 4,001,521 A * | 1/1977 | Fukata et al. | ................... | 327/45 |
| 6,400,928 B1 * | 6/2002 | Khullar et al. | ............. | 455/67.11 |
| 7,145,938 B2 * | 12/2006 | Takeuchi et al. | .............. | 375/147 |
| 7,369,485 B2 * | 5/2008 | Halford et al. | ................ | 370/208 |
| 8,014,270 B2 * | 9/2011 | Halford et al. | ................ | 370/208 |
| 8,165,237 B2 * | 4/2012 | Tseng et al. | .................. | 375/260 |
| 8,213,524 B2 * | 7/2012 | Tseng et al. | .................. | 375/260 |
| 8,320,483 B2 * | 11/2012 | Saito | ............................ | 375/260 |
| 8,358,668 B2 * | 1/2013 | Zhang et al. | .................. | 370/470 |
| 8,385,473 B2 * | 2/2013 | Liu et al. | ....................... | 375/324 |
| 8,576,950 B2 * | 11/2013 | Hasegawa et al. | ............ | 375/316 |
| 8,681,850 B2 * | 3/2014 | Kawauchi et al. | ........... | 375/232 |
| 2009/0304062 A1 * | 12/2009 | Tseng et al. | .................. | 375/232 |

(Continued)

FOREIGN PATENT DOCUMENTS

JP 61-181229 A 8/1986
JP 2005-295053 A 10/2005

(Continued)

OTHER PUBLICATIONS

Japanese Office Action, Patent Application No. 2012-053514, dated Jul. 15, 2014.

(Continued)

*Primary Examiner* — Sophia Vlahos
(74) *Attorney, Agent, or Firm* — Patterson & Sheridan, LLP

(57) ABSTRACT

A signal identification device identifies the carrier mode applied to a received signal that has control information embedded therein by extracting the control information from the received signal, generating multiple reference signals, each of the reference signals corresponding to one of multiple formulations of control information for one or more carrier transmission modes, performing a correlation operation on the control information against each of the reference signals, and determining the carrier mode based on results of the correlation operations.

5 Claims, 4 Drawing Sheets

(56) References Cited

U.S. PATENT DOCUMENTS

2010/0202574 A1     8/2010   Chen et al.
2010/0329405 A1    12/2010   Chen et al.
2012/0099676 A1*    4/2012   Hasegawa et al. ............ 375/340

FOREIGN PATENT DOCUMENTS

| | | |
|---|---|---|
| JP | 2007-036511 A | 2/2007 |
| JP | 2007-336078 | 12/2007 |
| JP | 2008-005115 | 1/2008 |
| JP | 2008-167493 | 7/2008 |
| JP | 2010-521841 A | 6/2010 |
| JP | 2012-095136 A | 5/2012 |
| WO | 2007/029406 A1 | 3/2007 |

OTHER PUBLICATIONS

Japanese Office Action, Patent Application No. 2012-053514, dated Sep. 16, 2014.

* cited by examiner

US 9,071,469 B2

SIGNAL IDENTIFICATION DEVICE

CROSS-REFERENCE TO RELATED APPLICATION

This application is based upon and claims the benefit of priority from Japanese Patent Application No. 2012-053514, filed Mar. 9, 2012; the entire contents of which are incorporated herein by reference.

FIELD

Embodiments described herein relate to a signal identification device.

BACKGROUND

A receiving device of a communication system (a communication device on the receiving side), may be able to receive signals with an unknown modulation method. Namely, it may be able to determine the modulation method applied to the received signal and carry out demodulation based on the results of the determination. The determination of whether the received signal is multi-carrier modulated or single-carrier modulated (carrier mode determination) is generally performed based on the statistics of the waveform. For example, there are known determination methods that perform the steps of finding the variance for the signal in the frequency domain and determining the carrier mode according to the number of carriers with a variance exceeding a threshold, or determining the carrier mode by detecting the level of similarity to a Gaussian distribution or an arbitrary frequency distribution (e.g., Rayleigh distribution or the like).

In general, in contrast to the time domain waveform of a signal to which a multi-carrier modulation method has been applied (referred to as MC signal hereinafter) that forms a waveform like noise, a signal to which a signal-carrier modulation method has been applied (referred to as SC signal hereinafter) takes on the form modulated by the specific modulation method. Therefore, the carrier mode can be distinguished by investigating the probability distribution of the amplitude. However, if the signal component of the noise increases relative to the desired signal, such as in the case of low SNR (signal to noise power ratio), it is easier to make an erroneous decision in the carrier mode determination using the statistics of the waveform because the waveform approaches a Gaussian distribution to look like an MC signal, even though the waveform is that of an SC signal.

DETAILED DESCRIPTION

Embodiments provide a signal identification device for determining the carrier mode applied to a received signal with a high degree of accuracy.

In general, embodiments will be described in detail below with reference to the drawings. Furthermore, the present disclosure is not limited to these embodiments.

According to the first embodiment of the present disclosure, a signal identification device identifies the carrier mode applied to a received signal that has control information embedded therein by extracting the control information from the received signal, generating multiple reference signals, each of the reference signals corresponding to one of multiple formulations of control information for one or more carrier transmission modes, performing a correlation operation on the control information against each of the reference signals, and determining the carrier mode based on results of the correlation operations.

First Embodiment

FIGS. 1A to 1F are block diagrams of main parts of a transmission device for sending a signal to a receiving device provided with the signal identification device of the first embodiment and a format of a transmitted signal (frame). In the present embodiment, a transmitting device and a receiving device that send and receive a DTMB (Digital Terrestrial Multimedia Broadcast) will be described as an example. The multi-carrier mode and single-carrier mode are selectable with the transmitting device of the DTMB signal, and the receiving device performs a demodulation according to the carrier mode selected by the transmitting device. In the receiving operation in the receiving device, after the carrier mode applied to the received signal is identified, demodulation is performed according to the carrier mode applied to the received signal.

Figure 1:
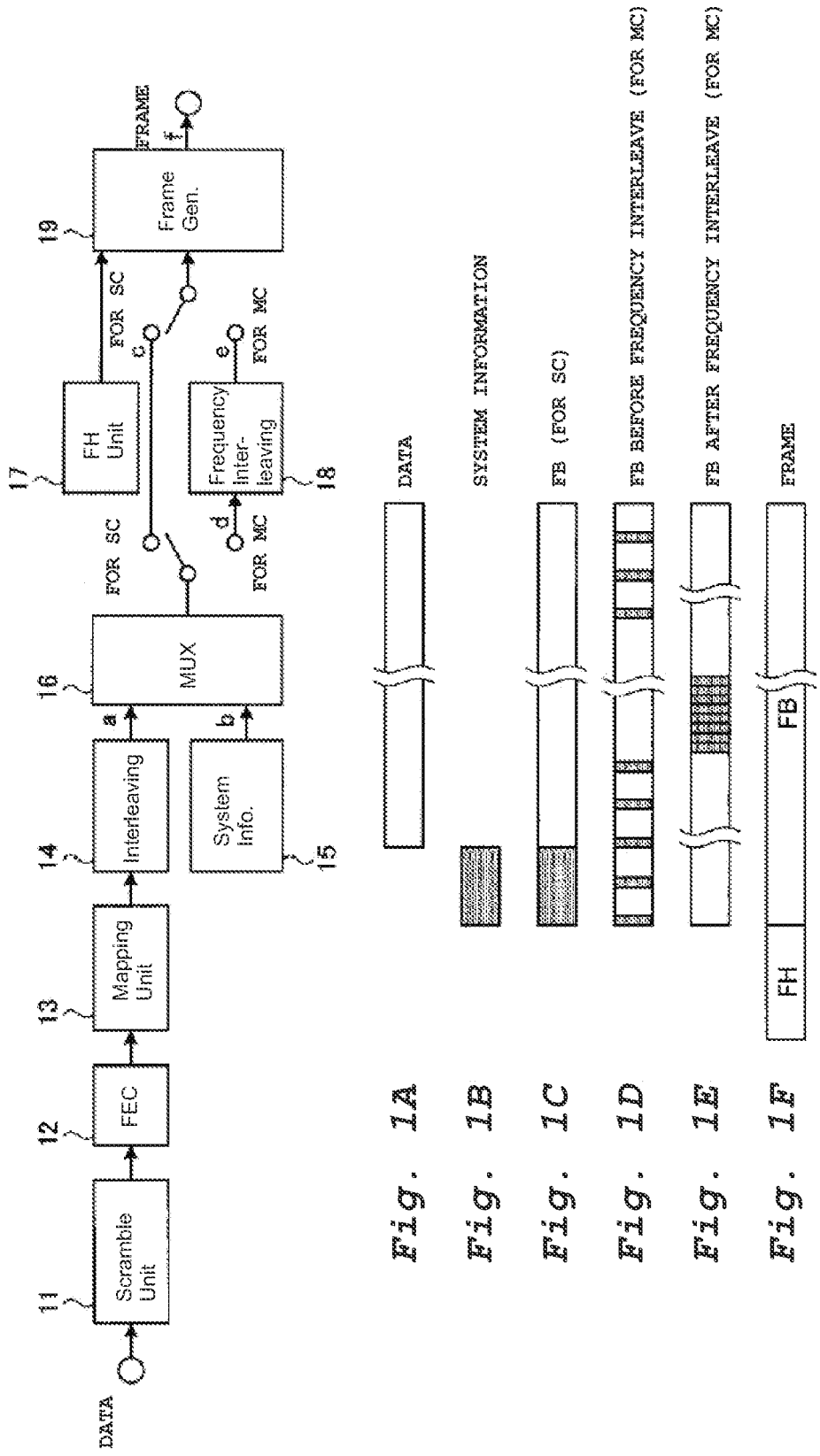
FIGS. 1A to 1F are block diagrams of main parts of a transmission device for sending a signal to a receiving device provided with a signal identification device of a first embodiment.

The transmitting device shown in FIGS. 1A to 1F is provided with a scramble unit 11, an FEC (forward error correction) unit 12, a mapping unit 13, an interleaving unit 14, a system information generating unit 15, a data multiplexing unit 16, a frame header (FH) generating unit 17, a frequency interleaving unit 18, and a frame generating unit 19, as the main components. FIG. 1A shows the signal output from the interleaving unit 14. FIG. 1B shows the signal (with the system information as the control information) output from the system information generating unit 15. FIG. 1C shows the signal (frame body) output from the data multiplexing unit 16 when in single-carrier mode. FIG. 1D shows the signal (frame body) output from the data multiplexing unit 16 when in multi-carrier mode. FIG. 1E shows the signal (frame body) output from the frequency interleaving unit 18. and FIG. 1F shows the signal (frame) output from the frame generating unit 19.

The operations of the transmitting device for generating and sending the DTMB signal in frames will be described. The data that is sent is first input to the scramble unit 11, and the scramble unit 11 randomizes the transmitted data that is input. The randomized data is coded by the FEC 12, and then modulated in the mapping unit 13 according to a specified modulation method. The modulated signal (also referred to herein as "symbols") is input to the interleaving unit 14, and the interleaving unit 14 performs a shuffling to produce the transmitted data (transmitted symbols), which is data in the time domain (shown FIG. 1A). This data is input into the data multiplexing unit 16. The data multiplexing unit 16 inserts the system information input from the system information generating unit 15 (see FIG. 1B) at the predetermined location of the data input from the interleaving unit 14. Data into which system information has been inserted is called the "frame body" (FB). When the data is transmitted via single-carrier mode, the FB output from the data multiplexing unit 16 (data with the system information inserted) becomes the final FB. When the data is transmitted via multi-carrier mode, the FB output from the data multiplexing unit 16 is shuffled in the frequency interleaving unit 18 to become the final FB.

For single-carrier mode, the FB is formatted with a 36-symbol system information that is multiplexed at the beginning of the 3744-symbol data (see FIG. 1C). Here, the system information indicates the FB mode (carrier mode), the modulation method of the data unit, the code rate, and the interleave length. A total of 44 types signal patterns can be represented in the system information because there are 2 types for the information indicating the carrier mode, 11 types for the information indicating a combination of the modulation method and code rate, and 2 types for the information indicating the interleave length.

When the carrier mode is multi-carrier mode (i.e. the number of carriers is 3780), the resulting FB with the system information inserted into the data is passed to the frequency interleaving unit 18 and becomes the final FB by carrying out a shuffling of the data in the FB (including the system information) in the frequency interleaving unit 18. Furthermore, when the carrier mode is the multi-carrier mode, after frequency interleaving, the system information is concentrated in the center of the FB (see FIGS. 1D, 1E).

The FB generated via the above procedure is combined with an FH (frame header) having a pseudorandom sequence generated by the FH generating unit 17 in the frame generating unit 19, and they are output as the frame (FIG. 1F). Furthermore, in multi-carrier mode, the frame generating unit 19 executes an inverse frequency transform on the FB.

Figure 2:
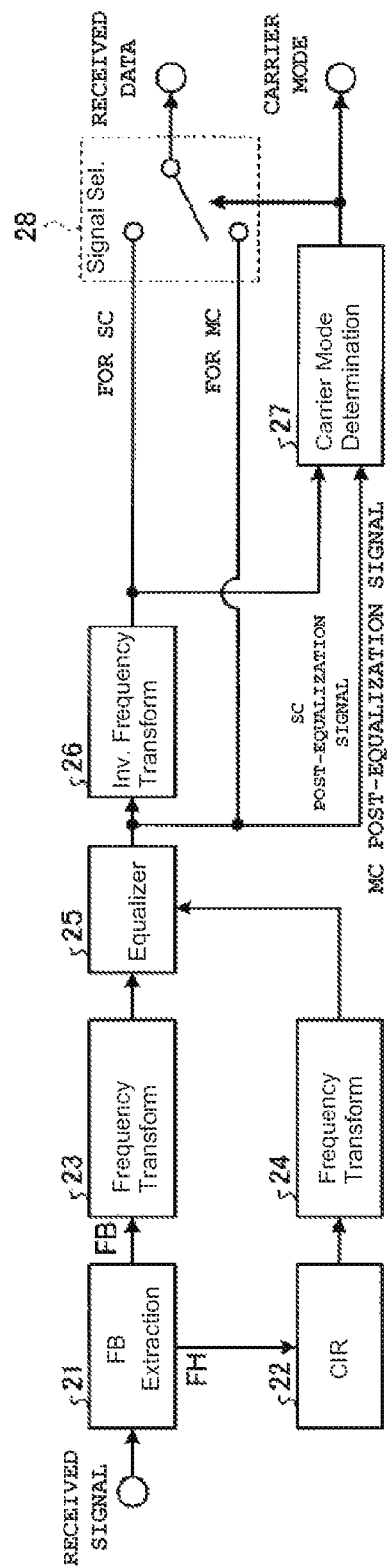
FIG. 2 is a block diagram of a main part of a receiving device provided with the signal identification device of the first embodiment.

FIG. 2 is a block diagram of the main part of a receiving device provided with the signal identification device of the present embodiment. This receiving device receives the DTMB signal sent from the transmitting device shown in FIGS. 1A to 1F. For the DTMB signal that is received, the carrier mode is not known, so the signal identification device determines the carrier mode of the DTMB after it is received.

The receiving device shown in FIG. 2 is provided with an FB extraction unit 21, a Channel Impulse Response (CIR) calculating unit 22, frequency transform units 23, 24, an equalizer 25, a inverse frequency transform 26, a carrier mode determination unit 27, and a post-equalization signal selection unit 28, as the main components.

In the receiving device shown in FIG. 2, the FB extraction unit 21 extracts the FB (frame body) from the received signal and the extracted FB is output to frequency transform unit 23. The FH (frame header) other than the FB is output to the CIR calculating unit 22. The CIR calculating unit 22 calculates the CIR based on the FH extracted from the received signal. The frequency transform unit 23 converts the FB to a signal in the frequency domain. The frequency transform unit 24 converts the FH to a signal in the frequency domain. The equalizer 25 performs a channel equalization by dividing the FB in the frequency domain by the CIR in the frequency domain, which restores the FB sent by the transmitting device. The inverse frequency transform 26 converts the signal (post-equalization FB) output from the equalizer 25 to a signal in the time domain.

Here, if the carrier mode of the received signal is MC mode (multi-carrier mode), the system information can be extracted from the output signal of the equalizer 25. Furthermore, in the descriptions hereinafter, the post-equalization signal that is output from the equalizer 25 will be called an MC post-equalization signal. On the other hand, if the carrier mode of the received signal is SC mode (single-carrier mode), the system information is extracted from the output signal of the inverse frequency transform 26 which converts the output signal of the equalizer 25 to a signal in the time domain. Furthermore, in the descriptions hereinafter, the output signal of the inverse frequency transform 26 that corresponds to the MC post-equalization signal will be called the SC post-equalization signal. The MC post-equalization signal and SC post-equalization signal are input into the carrier mode determination unit 27 and the post-equalization signal selection unit 28, respectively. The carrier mode determination unit 27, which is the signal identification device of the present embodiment, determines the carrier mode based on at least one of the MC post-equalization signal and the SC post-equalization signal and outputs information showing the results of the decision. The post-equalization signal selection unit 28 selects the signal corresponding to the results of the decision in the carrier mode determination unit 27 from among the input MC post-equalization signal and SC post-equalization signal and outputs it as the received data (the signal corresponding to the signal shown in FIG. 1A). It is omitted from the illustration, but in the latter part of the post-equalization signal selection unit 28, the receiving device is provided with a processing block (which will be called "data reception processing unit" hereinafter) that carries out demodulation processing and decoding processing on the received data according to the results of the decision in the carrier mode determination unit 27.

Furthermore, as long as the MC post-equalization signal and SC post-equalization signal are obtained, the configuration of the receiving device is not restricted to the one shown in FIG. 2. For example, in the receiving device of FIG. 2, the equalization is carried out in the frequency domain, but the equalization may be performed in the time domain. In such a case, the frequency transform units 23 and 24 shown in FIG. 2 are deleted, and the FB is equalized in the time domain. Then, the signal after equalization is used as the SC post-equalization signal. The MC post-equalization signal is obtained by converting the signal after equalization to a signal in the frequency domain.

Figure 3:
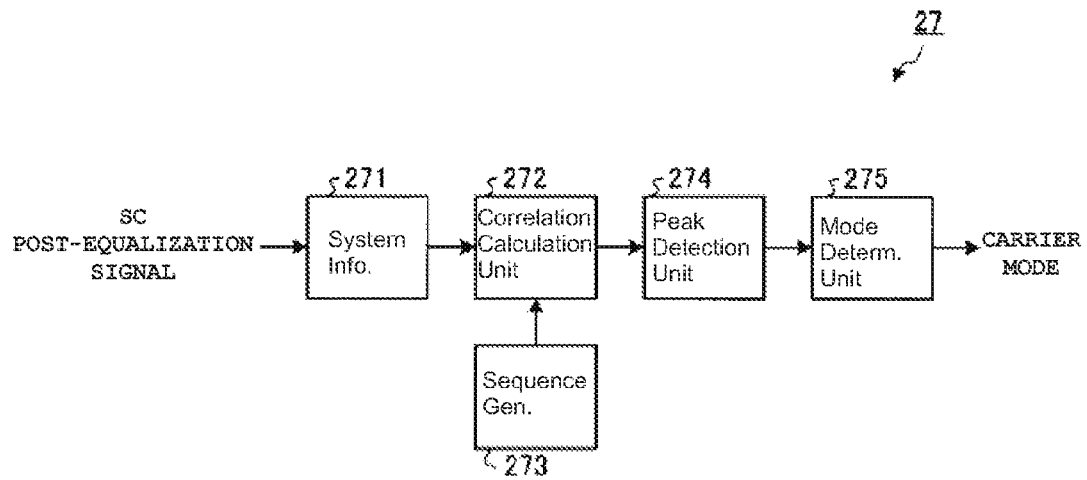
FIG. 3 is a block diagram of the signal identification device according to the first embodiment.

Next, the configuration and detailed operation of the carrier mode determination unit 27 will be described using FIG. 3. FIG. 3 is a block diagram of the carrier mode determination unit 27, which is a signal identification device according to the first embodiment. In the first embodiment, the carrier mode determination unit 27, when it makes a carrier mode determination based on the SC post-equalization signal, will be described.

The carrier mode determination unit 27 of the present embodiment is provided with a system information extraction unit 271, a correlation calculating unit 272, a sequence generating unit 273, a peak detection unit 274, and a mode determination unit 275. Furthermore, in FIG. 3, the description of the functional block that selects the SC post-equalization signal from among the input signals from the equalizer 25 and the inverse frequency transform 26 and inputs it into the system information extraction unit 271 is omitted.

The system information extraction unit 271, which acts as an information extraction means in the carrier mode determination unit 27, extracts the symbols inserted in the 36-symbol system information from the input SC post-equalization signal. Hereinafter, the system information extracted from the signal of the SC post-equalization signal will be called SC system information.

The SC system information is input into the correlation calculating unit 272. The sequence generating unit 273, which acts as a reference signal generation means, generates the 22 types of signal patterns with the carrier mode set to SC mode from among the 44 types of system information patterns as a reference signal and outputs them to the correlation calculating unit 272. The correlation calculating unit 272 performs a correlation operation with the SC system information for each reference signal (the 22 types of patterns of the system information). The peak detection unit 274 selects the biggest of the values from among the correlation values (a total of 22 correlation values) calculated by the correlation calculating unit 272 and outputs them to the mode determination unit 275. Based on the correlation value input from the peak detection unit 274, the mode determination unit 275 determines the carrier mode applied to the received signal. Specifically, the correlation value and the threshold for carrier mode determination are compared, and if the correlation value is at or above the threshold, it is determined to be in SC mode. If the correlation value is below the threshold, it is determined to be in MC mode.

This is a description of a case in which the carrier mode determination is made based on the SC post-equalization signal, but it is also possible to make a carrier mode determination based on the MC post-equalization signal. In addition, it is also possible to make a carrier mode decision based on the SC post-equalization signal and the MC post-equalization signal. The determination based on the MC post-equalization signal and the determination based on the SC post-equalization signal and MC post-equalization signal will be described in other embodiments.

If the MC post-equalization signal and SC post-equalization signal are different from the actual carrier mode (an SC post-equalization signal when it is transmitted via MC mode or an MC post-equalization signal when it is transmitted via SC mode), the signal has a waveform like that of noise. By carrying out the correlation operation using these properties, if the post-equalization signal matches the carrier mode, the correlation peak is obtained, and if it does not match, the correlation peak no longer stands out. This makes it possible to make a carrier mode determination with few erroneous decisions by a correlation operation because it can be treated as an inherent signal in which the system information identifies the carrier mode by comparing the post-equalization signal according to the carrier mode.

In this way, the signal identification device of the present embodiment carries out equalization processing corresponding to SC mode on the received signal, and it carries out a correlation operation corresponding to each of the values that can be taken by the system information during SC mode (22 types of patterns) and the system information that is included in the post-equalization received signal (SC post-equalization signal). Because it also determines the carrier mode by comparing the peak of the calculated correlation value to the threshold for use in the carrier mode determination, the carrier mode can be identified with a high degree of accuracy.

Furthermore, in the above description, the mode determination unit 275 output as the results of the carrier mode determination (final decision results) the results of the decision based on the system information of the frame received at the beginning when the carrier mode is unknown, but the final decision results may also be output after the determination processing has been performed over multiple frames. This improves the accuracy of the decisions. For example, it is applicable to the method of making a decision about the carrier mode over N frames and outputting the results of the decision indicating SC mode if the number of times that it is determined to be SC mode is greater (further, the results of the individual decisions are not output while the decision is being made over N frames). It is also applicable to the method of integrating the correlation values output from the peak detection unit over N frames (outputting a total value) and the method of determining the carrier mode by comparing the results of the integral and a threshold. It is also applicable to the method of outputting the results of the carrier mode decision if the same results are determined for a set number of consecutive times. In addition, if the difference between the threshold and the correlation value calculated using the system information of the frame received at the beginning when the carrier mode is unknown is small, namely, if the reliability of the results of the decision is low, the accuracy of the decision may be improved by carrying out decision processing.

Second Embodiment

In the first embodiment, a signal identification device is described that makes a carrier mode determination based on the SC post-equalization signal, but in the second embodiment, a signal identification device will be described that makes a carrier mode determination based on the SC post-equalization signal and the MC post-equalization signal. In the second embodiment, the description of the sections in common with the first embodiment is omitted.

Figure 4:
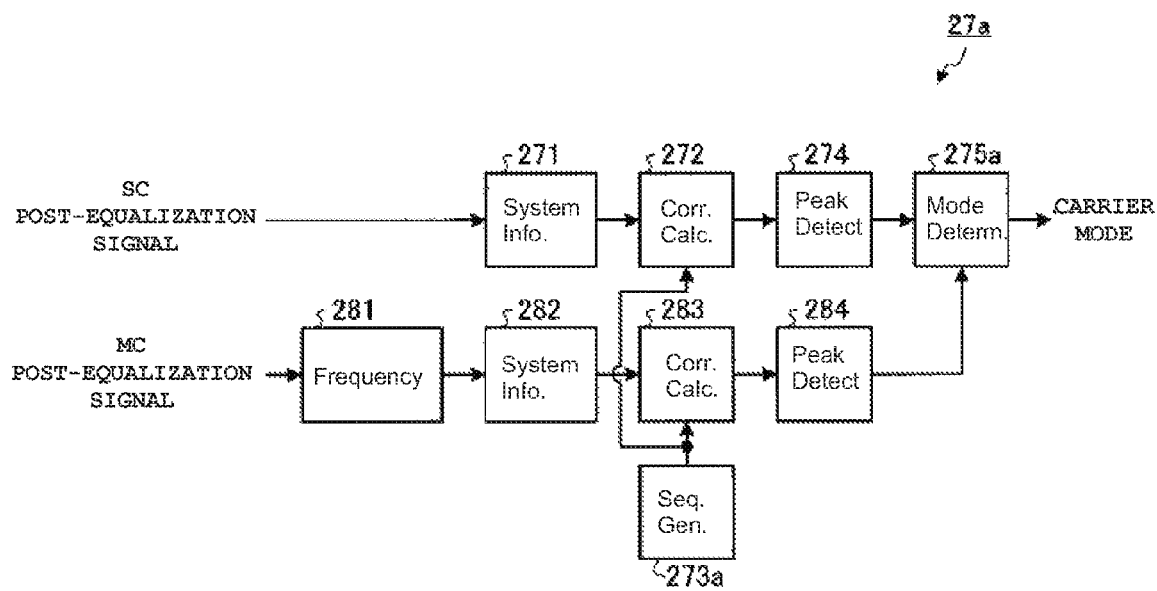
FIG. 4 is a block diagram of a signal identification device according to a second embodiment.

FIG. 4 is a block diagram of carrier mode determination unit 27a, which is a signal identification device according to the second embodiment. In contrast to the carrier mode determination unit 27 of the first embodiment (see FIG. 3), carrier mode determination unit 27a adds components and the like that perform a correlation operation using the MC post-equalization signal. Specifically, the sequence generating unit 273 and the mode determination unit 275 of the carrier mode determination unit 27 are replaced with a sequence generating unit 273a and mode determination unit 275a. Furthermore, frequency deinterleaving unit 281, system information extraction unit 282, a correlation calculating unit 283, and a peak detection unit 284 are added.

In carrier mode determination unit 27a, frequency deinterleaving unit 281 performs an operation that is the inverse of the frequency interleave carried out by the signal transmission source (transmitting device) on the input MC post-equalization signal and shuffles the data. System information extraction unit 282 extracts the symbols inserted in the 36-symbol system information from the MC post-equalization signal after frequency deinterleaving. Hereinafter, the system information extracted from the MC post-equalization signal after frequency deinterleaving will be called MC system information. The MC system information is input into the correlation calculating unit 283.

The sequence generating unit 273a generates 44 types of system information patterns as a reference signal and outputs to the correlation calculating unit 272 the 22 types of signal patterns with the carrier mode set to SC carrier mode, and, outputs to the correlation calculating unit 283 the 22 types of signal patterns with the carrier mode set to MC carrier mode.

The correlation calculating unit 283 performs a correlation operation with the MC system information for each reference signal (the 22 types of patterns of the system information). The peak detection unit 284 selects and outputs the biggest of the values from among the correlation values calculated by the correlation calculating unit 283. The correlation value selected by the peak detection unit 274 and the correlation value selected by the peak detection unit 284 are input into mode determination unit 275a, and mode determination unit 275a determines the carrier mode applied to the received signal based on the correlation values input from the peak detection unit 274 and 284 (taking them to be the correlation value of the SC system information and the correlation value of the MC system information). Specifically, it compares the correlation value of the SC system information and the correlation value of the MC system information and determines the carrier mode corresponding to the larger correlation value to be applicable. Namely, if the correlation value (correlation value of the SC system information) input from the peak detection unit 274 is bigger, it is determined to be SC mode. If the correlation value (correlation value of the MC system information) input from the peak detection unit 284 is bigger, it is determined to be MC mode.

In this way, the signal identification device of the present embodiment generates an SC post-equalization signal by executing equalization processing corresponding to the SC mode on the received signal, and it also generates an MC post-equalization signal by executing equalization processing corresponding to the MC mode on the received signal. It carries out a correlation operation with the system information on the SC post-equalization signal and the MC post-equalization signal and determines the carrier mode based on the resulting correlation values. This makes it possible to realize a higher level of accuracy in the decisions compared to the first embodiment and to maintain a high level of accuracy in the decisions even in an environment with a large noise component relative to the desired signal, such as with a low SNR.

Furthermore, in order to further improve the accuracy of the decisions about carrier mode, the final results of the decision may be output after making a decision spanning multiple frames in mode determination unit 275a.

Third Embodiment

The signal identification device according to the first embodiment, which makes a carrier mode determination based on the SC post-equalization signal, is described, but it is also possible to realize a signal identification device that makes a carrier mode determination based on the MC post-equalization signal. In this case, the system information extraction unit 271 and the correlation calculating unit 272 of the carrier mode determination unit 27 shown in FIG. 3 may be replaced by frequency deinterleaving unit 281, system information extraction unit 282, and the correlation calculating unit 283 shown in FIG. 4. At this point, the sequence generating unit 273 is set to generate the 22 types of signal patterns with the carrier mode set to MC mode.

In cases with this configuration, the carrier mode can be determined with the same level of precision as the first embodiment, based on the MC post-equalization signal.

Fourth Embodiment

Figure 5:
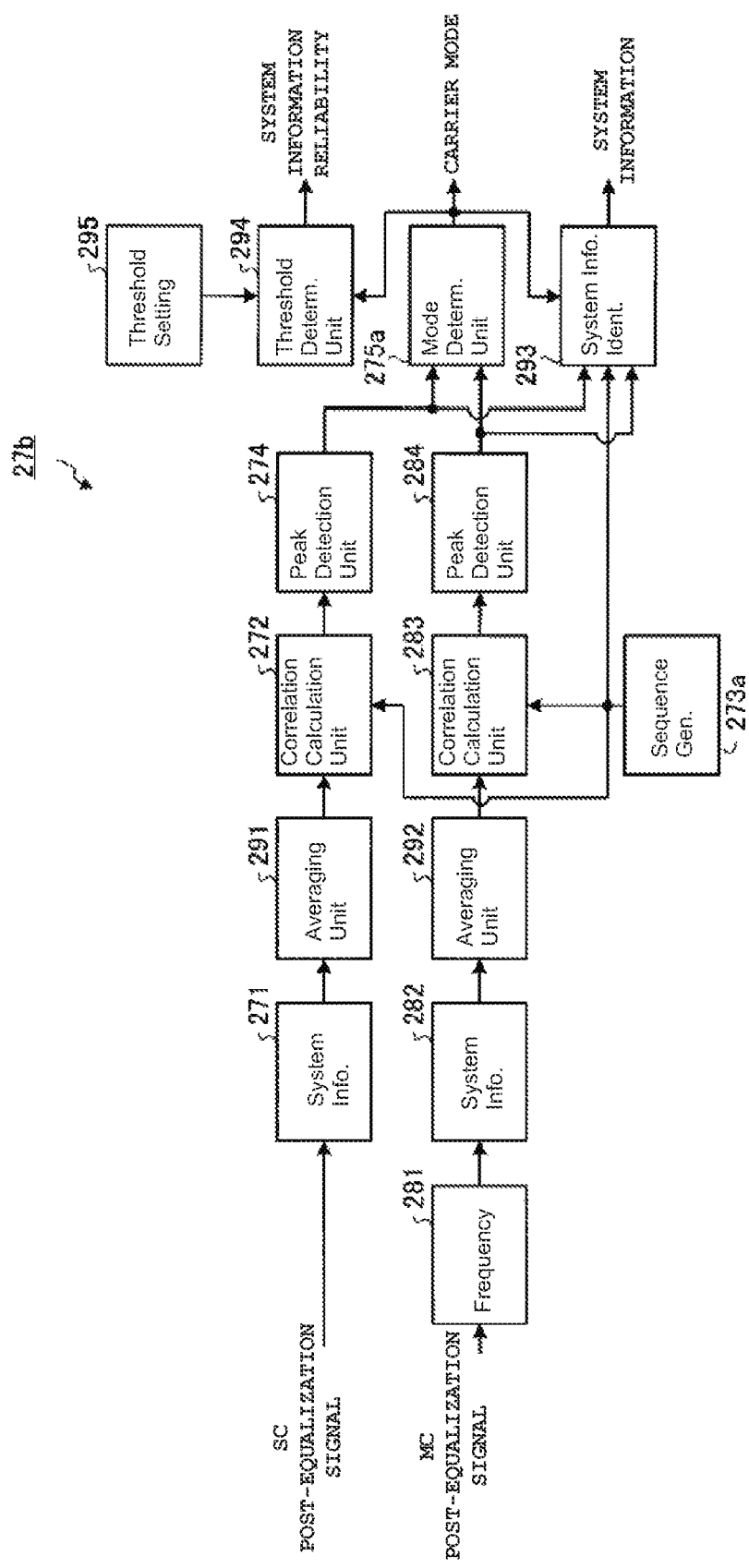
FIG. 5 is a block diagram of a signal identification device according to another embodiment.

FIG. 5 is a block diagram of carrier mode determination unit 27b, which is a signal identification device according to the fourth embodiment. In carrier mode determination unit 27b, averaging units 291, 292, a system information identification unit 293, threshold determination unit 294, and threshold setting unit 295 are added to carrier mode determination unit 27a described in the second embodiment. In the present embodiment, the description of the sections in common with the second embodiment is omitted.

Averaging unit 291 in carrier mode determination unit 27b averages the SC system information output from the system information extraction unit 271 over 2 frames or more and outputs the SC system information after averaging. Averaging unit 292 averages the MC system information output from system information extraction unit 282 over 2 frames or more and outputs the MC system information after averaging.

The system information identification unit 293, acting as a reference signal selection means, selects and outputs the system information corresponding to the received signal from among the 44 types of system information output from the sequence generating unit 273a. Namely, it outputs the system information used by the correlation calculating unit after the biggest value (peak value) is obtained from among all the correlation values of the correlation values calculated by the correlation calculating unit 272 and 283. This makes it possible to realize a reduction in the scale of the circuit, a reduction in the volume of calculations, and a shortening of processing time without the need for decoding of the system information by latter stage data reception processing unit or the like, which is omitted from the illustration. Furthermore, sequence generating unit 273a, the correlation calculating units 272, 283, and the peak detection units 274, 284 operate so that the system information identification unit 293 can recognize the system information after the peak value is obtained. For example, when it calculates the correlation value, the correlation calculating units 272, 283 output the correlation value as well as the information concerning the system information used in the calculation to the peak detection units 272, 284, and when the maximum value of the correlation value is output, the peak detection units 274 and 284 report to the system information identification unit 293 the system information used in the calculation when the maximum value is obtained. Or when the maximum value of the correlation value is output, the peak detection units 274 and 284 report to the system information identification unit 293 at what position in the input correlation values from the correlation calculating unit 272 and 273 the output correlation value corresponds to. The system information that sequence generating unit 273a sequentially outputs is also input to the system information identification unit 293, so the system information identification unit 293 can find out the system information when the maximum value is obtained, as long as it is notified by the peak detection units 274 and 284 concerning at what position the maximum value of the correlation value is calculated.

Threshold determination unit 294, which acts as a reliability information generation means, compares the correlation value selected by mode determination unit 275a (the bigger of the correlation value of the SC system information and the correlation value of the MC system information) and the threshold set by threshold setting unit 295 and outputs the results of the comparison (the magnitude relationship with the threshold, the difference from the threshold, and the like) to the later stage data reception processing unit as reliability information for the system information. Threshold setting unit 295 sets and adjusts the threshold used by threshold determination unit 294. Furthermore, mode determination unit 275a reports to threshold determination unit 294 the larger of the correlation value of the SC system information and the correlation value of the MC system information. Mode determination unit 275a may not report the correlation value, instead the correlation calculating units 272 and 273 may report the correlation value to threshold determination unit 294, and mode determination unit 275a may report the results of the selection (which is the bigger of the correlation value of the SC system information and the correlation value of the MC system information) to threshold determination unit 294.

In this way, since the signal identification device of the present embodiment is made to average the system information over multiple frames in averaging units 291 and 292, it can remove the noise components in the MC system information and SC system information. This improves the SN ratio, consequently improving the accuracy of the carrier mode decisions. Furthermore, because the post-equalization signal, which differs from the actual carrier mode, forms a waveform like that of noise, the signal component obtained via averaging is suppressed. As a result, as the correlation peak difference from the desired carrier mode grows larger, the detection precision of the carrier mode determination improves even more.

In addition, because threshold determination unit 294 and threshold setting unit 295 have been provided, the fact that the status of the transmission path is inferior due to noise or a multipath situation can be reported to the latter stage data reception processing unit as the reliability of the system information. This makes it possible to carry out an adaptive treatment, such as switching to a robust operating mode, to prevent a malfunction if the reliability of the system information is low, waiting so that the system information is not used (so that the demodulation of the data is not performed).

In addition, since system information identification unit 293 is provided, it is no longer necessary to provide a separate circuit to decode the system information, and the scale of the circuit can be reduced. Furthermore, because the system information can be decoded at the same time as the carrier mode determination, the decoding processing time of the system information can be shortened.

Furthermore, the signal identification device of the present embodiment is provided with averaging unit 291 and 292, system information identification unit 293, threshold determination unit 294, and threshold setting unit 295, but the signal identification device may optionally be configured by providing a subset of these components. Namely, by improving the SN ratio, if there is a desire to improve the degree of precision of the carrier mode determination, the averaging units 291, 292 at the very least may be provided. In addition, if there is a desire to reduce the scale of the circuit, system information identification unit 293 at the very least may be provided. If the reliability information of the system information that system information identification unit 293 outputs is necessary, in addition to system information identification unit 293, a configuration may be used in which threshold determination unit 294 and threshold setting unit 295 are further provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying Claims and their equivalents are intended to cover such forms or modifications as would fall within the scope and spirit of the inventions.

For example, in each embodiment, a signal identification device (carrier mode determination unit) comprising a receiving device of a DTMB signal is described, but the signal identification device is applicable to receiving devices that receive a frame configured with information that is equivalent to the aforementioned system information (information in which the pattern varies according to the carrier mode). In addition, it is not necessary for all of the frames to include the information used in the carrier mode determination (the aforementioned system information or the like).

What is claimed is:

1. A method of determining a carrier mode applied to a received signal that has control information embedded therein, comprising:
    extracting the control information from the received signal;
    generating first and second sets of reference signals, each of the reference signals of the first set corresponding to one of multiple formulations of control information for a single carrier transmission mode and each of the reference signals of the second set corresponding to one of multiple formulations of control information for a multi-carrier transmission mode;
    determining a first correlation value by performing a first correlation operation on the control information against each of the reference signals in the first set;
    determining a second correlation value by performing a second correlation operation on the control information against each of the reference signals in the second set;
    selecting the greater of the first and second correlation values as a selected correlation value;
    determining a transmission mode corresponding to the selected correlation value as the carrier mode;
    comparing the selected correlation value with a predetermined threshold; and
    outputting a result of the comparing as an indication of the reliability of the control information.

2. The method of claim 1, wherein
    a correlation value is calculated in each of the first correlation operations, and a maximum of the correlation values resulting from the first correlation operations is determined as the first correlation value, and
    a correlation value is calculated in each of the second correlation operations, and a maximum of the correlation values resulting from the second correlation operations is determined as the second correlation value.

3. The method of claim 2, wherein the transmission mode is determined to be a single carrier transmission mode when the first correlation value is the selected correlation value, and the transmission mode is determined to be a multi-carrier transmission mode when the second correlation value is the selected correlation value.

4. The method of claim 1, wherein the received signal is processed by a first extraction unit that extracts the control information and a second extraction unit that extracts the control information.

5. The method of claim 4, wherein, prior to being processed by the second extraction unit, the received signal is deinterleaved.

* * * * *